United States Patent Office 3,428,464
Patented Feb. 18, 1969

3,428,464
REFRACTORY COATING COMPOSITIONS
Leonard W. Pollard, Burlington, Ontario, Canada, assignor to Alchem Limited, Burlington, Ontario, Canada, a corporation of Canada
No Drawing. Filed Feb. 2, 1965, Ser. No. 429,886
U.S. Cl. 106—38.23                 11 Claims
Int. Cl. C04b 35/16

ABSTRACT OF THE DISCLOSURE

A coating composition especially suitable for coating of cast iron mold stools which comprises a suspension of finely divided macroscopic refractory solid particles in an aqueous liquid containing a binder is stabilized with an Xanthomonas hydrophilic colloid.

---

This invention relates to new and improved refractory coating compositions, and to a process for the preparation thereof. It is especially concerned with compositions suitable for application to ingot mold stools.

Recently, investigations have been conducted to find means for supplying and applying a suspended slurry or dispersion of a refractory of finely-divided, silica powder in aqueous colloidal silica for improving ingot mold stool life. The slurry or dispersion is applied to the ingot stool, the mold is placed on the stool, and hot metal is poured into the mold.

When the simple combination of aqueous colloidal silica and silica powder is applied by a coarse spray to the stools, a hard, dense adherent coating is obtained on the stool which reduces erosion of the stool by the hot metal, thereby extending the productive life of the stool. The siliceous coating also prevents the ingot from sticking to the stool.

With this simple combination of aqueous colloidal silica and silica powder, it is necessary to agitate the slurry or dispersion continuously to prevent settling of the suspended silica powder. If the silica powder settles in tanks or spray lines, the equipment must be dismantled and cleaned. It is, however, possible to apply such compositions to stools by brushing or rolling the composition onto the stools, thereby avoiding the plugging and cleaning problems associated with spray applications, but this approach has obvious limitations for efficient, economic application. Spray equipment employing a pressure tank equipped with an agitator, while more efficient, requires that all slurry lines be evacuated immediately after use, either to waste or back into the pressure tank to prevent line plugging. This approach becomes complicated in casting operations utilizing frequent short-term stool coating.

Considerable efforts have been expended in finding a suspending agent for keeping the silica powder in relatively stable suspension in the aqueous colloidal silica. In several instances, a suspending agent was found which produced stable suspension, but the siliceous slurry, with the suspending agent therein failed because the resultant composition did not adhere satisfactorily to the stool, particularly where the application was made to a stool hot enough so that the liquid phase of the composition vaporized almost instantaneously upon application.

The reason for this problem is that the suspending agent is also a thickening agent. The suspended slurry is much more viscous than the simple combination mentioned above. Consequently, even if it were possible to force the material through a hose and coarse nozzle using the pressure tank system described above, the incremental thickness of the coating is such that the steam generated, when the coating slurry hits the hot stool, lifts the layer and prevents bonding of the coating to the stool. Unless the coating is securely bound to the stool, no protection is conferred. Brush coating of stools with the suspended slurry produces the same problems.

It has been discovered in accordance with the invention, that the use of a particular type of suspending agent in a refractory coating composition comprising a slurry of refractory particles in a liquid containing a binder makes it possible to prepare a stabilized slurry which can be mechanically atomized, and when applied in atomized form to a solid surface such as a hot ingot stool will build up a hard, dense, adherent layer. The quantity of slurry and the area of coating are easily and accurately controlled, resulting in economic application rates.

The suspending agent employed for the purpose of the invention is a Xanthomonas hydrophilic colloid. The said colloid is a polymer containing mannose, glucose, potassium glucuronate and acetyl in the approximate molar ratio of 2:1:1:1. In such a colloid, the potassium portion can be replaced by several other cations without substantial change in the property of the said material for the purpose of the invention. The said colloid, which is a high molecular weight, exocellular material, may be prepared by the bacterium, *Xanthomonas campestris*, NRRL B-1459, by whole culture fermentation of a medium containing 2-5 percent commercial glucose, organic nitrogen source, dipotassium hydrogen phosphate and appropriate trace elements. The incubation time is approximately 96 hours at 28° C., under aerobic conditions.

In preparing the colloid as aforesaid, it is convenient to use corn steep liquor or distillers' dry solubles as an organic nitrogen source. It is expedient to grow the culture in two intermediate stages prior to the final inoculation in order to encourage vigorous growth of the bacteria. These stages may be carried out in media having a pH of about 7. In a first stage a transfer from an agar slant to a dilute glucose broth may be made and the bacteria cultured for 24 hours under vigorous agitation and aeration at a temperature of about 30° C. The culture so produced may then be used to inoculate a higher glucose (3%) content broth of larger volume in a second intermediate stage. In this stage the reaction may be permitted to continue for 24 hours under the same conditions as the first stage. The culture so acclimated for use with glucose by the aforementioned first and second stages is then added to the final glucose medium. In the aforesaid method of preparing Xanthomonas hydrophilic colloid, a loopful of organism from the agar slant is adequate for the first stage comprising 200 milliliters of the said glucose media.

In the second stage the material resulting from the first stage may be used together with 9 times its volume of a 3% glucose media. In the final stage the material produced in the second stage may be admixed with 19 times its volume of the final media. A good final media may contain 3% glucose, 0.5% distillers' dry solubles, 0.5% dipotassium phosphate, 0.1% magnesium sulphate having 7 molecules of water of crystallization and water. The reaction in the final stage may be satisfactorily carried out for 96 hours at 30° C. with vigorous agitation and aeration. The resulting colloidal material can be recovered by precipitation in methanol of the clarified mixture from the fermentation. The foregoing suspending agent provides much more stable slurries than were provided by other suspending agents such as a causticized mixture of polyacrylic acid and polyacrylamine, a carboxy methyl cellulose and methyl cellulose and the like. The problems heretofore discussed with regard to plugging of spray equipment by the siliceous slurry are avoided when Xanthomonas hydrophilic colloid is employed as the suspending agent.

A typical slurry provided in accordance with the invention has the following general composition:

| Ingredients: | Percent by weight |
|---|---|
| Finely divided refractory | 10–70 |
| Binder including liquid | 30–90 |
| Xanthomonas colloid | Up to about 2 | the total being 100% and the viscosity being 1500 to 4500, preferably 1800–2500, centipoises at 70° C.

A specific example of such a slurry is as follows:

| Ingredients: | Percent by weight |
|---|---|
| Finely divided fused silica (325 mesh) | 50 |
| Silica sol containing 30% $SiO_2$ in water | 43.2 |
| Ethylene glycol | 6.5 |
| Xanthomonas hydrophilic colloid | 0.3 |

The preferred method of preparation is to add dilute sodium hydroxide in water to the silica sol in order to adjust the pH to 10.9 and add the ethylene glycol. Then, blend the Xanthomonas colloid with the fused silica and add this composite to the liquid whilst agitating rapidly. The rapid agitation is continued for at least 10 minutes and preferably in excess of one hour. The initial viscosity is determined after allowing the resultant slurry to stand for a few minutes. A preferred initial viscosity is 2000–2300 centipoises at 70° F.

The finely-divided refractory materials suspended or dispsersed in the slurries of the invention preferably consist of at least one siliceous refractory, e.g., vitreous silica, crystalline silica, or water-insoluble metal silicates, such as magnesium silicate, aluminum silicate, zirconium silicate or siliceous clays. There may be employed, however, nonsiliceous refractories, such as alumina and graphite.

These materials are all well-known substances and are all commercially available. Typical aluminum silicates, for example, may include mica, a laminated type of aluminum silicate and mullite, an orthorhombic aluminum silicate available from the Island of Mull or artificially made by heating andalusite, sillimanite or cyanite. Excellent magnesium silicates are forsterite or talc, while a useful zirconium silicate is zircon. A typical crystalline silica is quartz. The most preferred refractory, discussed in more detail hereinafter, is vitreous silica.

The binder employed in the slurries of the invention preferably is colloidal silica sol. There may be used, however, aqueous dispersions of aluminum phosphate, ethyl silicate, sodium silicate, or mixtures thereof with colloidal silica sol as the binder for the slurries of the invention.

The most preferred binder used to form the slurries of the invention is a colloidal silica sol. These are well-known materials and are commercially available from several sources of supply. A typical group of commercially available silica sols that may be used in the practices of the invention are those silica sols sold under the name "Nalcoag." Silica sols of this type are described below in Table I.

TABLE I

| Silica Sol | I | II | III | IV | V | VI |
|---|---|---|---|---|---|---|
| Percent colloidal silica as $SiO_2$ | 15 | 30 | 35–36 | 31–22 | 49–50 | 35 |
| pH | 8.6 | 10.2 | 8.6 | 3.7 | 9.0 | 3.5 |
| Viscosity at 77° F. cps | (1) | (1) | (1) | (2) | 20–30 | 6.5 |
| Specific Gravity at 68° F | 1.09 | 1.205 | 1.255 | 1.06 | 1.385 | 1.255 |
| Average Surface Area $M^2$ per gram of $SiO_2$ | 330–430 | 190–270 | 135–190 | 135–190 | 120–150 | 135–190 |
| Average Particle size millimicrons | 7.9 | 11–16 | 16–22 | 16–22 | 20–25 | 16–22 |
| Density lbs./U.S. gallon at 68° F | 9.1 | 10.0 | 10.5 | 8.8 | 11.6 | 10.5 |
| $Na_2O$ Percent | 0.04 | 0.40 | 0.10 | 0.05 | .030 | 0.01 |

[1] Less than 5.
[2] Less than 10.

Other silica sols that may be used in addition to those above, may be prepared by using several well-known conventional techniques. A convenient method of making aqueous colloidal silica sols is described in Bird, U.S. Patent 2,244,325, wherein a dilute solution of an alkali metal silicate is passed in contact with a cation exchange resin in hydrogen form, whereby the silicate is converted to a dilute aqueous colloidal silica sol. The dilute sol may be concentrated to solids concentrations which are more economically usable from the standpoint of shipping costs and ultimate process use, by employing the techniques described in either Bechtold et al. U.S. Patent 2,574,902; Broge et al., U.S. Patent 2,680,721; or Alexander et al. U.S. Patent 2,601,235. Another type of silica sol which may be used in the practices of the invention is described in the specification of Reuter, U.S. Patent 2,856,302. While aqueous colloidal silica sols may be used, it will be understood that other forms of colloidal silica may be employed, such as for instances, sols which contain a major portion of polar organic solvents. Said sols may be generically referred to as organo sols, and are typified by the sols described in Marshall U.S. Patent 2,386,247. It is only necessary that the silica particles used can be dispersed colloidally in a hydrophilic substance, such as water or lower alkyl alcohols and other organic compounds possessing relatively high dielectric constants.

In some instances mixtures of water and organic substances compatible with water may be employed as suspending media for the colloidal silica particles. Particularly preferred organic substances are those which lower the freezing point of pure aqueous sols by their admixture with these aqueous silica sols. Such final product sols then are especially useful during the colder months of the year when they must be stored and/or used at relatively low temperature. Amines such as morpholine, diethyl amine, etc., and polyhydroxy organics as ethylene glycol; propylene glycol 1,2; propylene glycol 1,3; glycerrine; etc., are preferred materials in making up silica sols containing these substances as sole silica suspending media or as a portion of a mixture additionally containing water. A preferred sol, "winterized" against freezing contains 5–50 parts by weight of polyhydroxy compound such as ethylene glycol, 20–85 parts by weight of water and 10–60 parts by weight of silica. In the practice of the present invention the glycol added to the composition is also employed in amount sufficient to inhibit bacterial decomposition of the Xanthomonas hydrophilic colloid. For this purpose the amount of glycol should be at least 0.5% and preferably at least 1% by weight of the composition.

Regardless of the method employed to produce the colloidal silica sol containing water, polar organic liquids or mixtures of these substances as a continuous suspending phase, it is desirable that said sols contain silica particles which are dense, amorphous, and have an average particle diameter which does not exceed 150 millimicrons. As evidenced by a reading of Table I, all the silica sols contemplated as starting materials have an average particle size diameter well below 150 millimicrons. Preferably, the starting silica sols have an average particle size diameter of from 10–50 millimicrons. The silica concentration in the sols may be between 0.1% and 60% by weight silica expressed $SiO_2$. More preferred sols contain from 3.0 to 60% by weight of silica and most preferably 10–60% by weight.

Other sols which may be employed as binders for the silica refractory are those known as "salt-free" silica sols. These are particularly preferred when the suspension media of the silica particles in the binder itself is solely a polar organic liquid or a mixture of water and polar organic liquid. Since many of the above described sols usually contain alkali metal compounds as stabilizers, they are generally not compatible with organic systems due to the fact that the salts present in the aqueous sol cause gelation or precipitation of the silica particles when the aqueous phases are exchanged for polar organic solvents. This can be avoided by use of "salt-free" aqueous silica sols as starting materials in preparation of pure organosols or mixtures of water and organic liquids as silica carriers. In order to avoid this gelation effect, it is necessary that the causative cations be removed from the surface of the colloidally dispersed silica particles and from the liquid phase of the sol. This may be readily accomplished by treating typical silica sols of the type described in Bechtold et al., U.S. Patent 2,574,902, with a cation exchange resin in the hydrogen form and a strong base anion exchange resin in hydroxide form. This treatment tends to produce a finished aqueous sol in which both the continuous aqueous phase of the sol and the particles of silica are considered "salt-free."

Typical commercially available silica sols which may be deionized to produce "salt-free" silica sols are those which are described in Table I above. These aqueous "salt-free" silica sols may be either used as such in combination with one or more of the named refractories to constitute a slurry coating material or may be modified whereby the aqueous phase is completely or partially exchanged for a hydrophilic polar liquid such as an alcohol or the alcohol is mixed with aqueous sol in desired proportions. The "salt-free" pure alcosols or aqueous-alcoholic silica sols may then be easily combined with a refractory and the resultant slurry used to coat the stools.

When the particle sizes of the silica sols described above are within the ranges specified, the silica particles present in the starting aqueous or organic sol have specific surface areas of at least 20 m.$^2$/g., and usually in excess of 100 m.$^2$/g. Further, when deionized sols are employed as a binder, they generally have a salt content expressed as $Na_2SO_4$, of less than 0.01%.

As mentioned above, the most preferred refractory materials are those generally referred to as vitreous silicas. These are glassy modifications of silica, obtained by the fusion of selected low temperature crystalline forms, and are frequently referred to as quartz glass or silica glass. Specific vitreous silicas include those particles made from fused quartz glasses, silicate glasses, silica glasses such as the well-known Vycor materials and fused silica glasses. With respect to all of these materials the thermal expansion coefficients are relatively small in proportion to other refractories such as those of the soda-lime and lead glass types. Generally, they have thermal expansion coefficients smaller than $5 \times 10^{-6}$ cm./cm./° C. Also, the silica content of these granular siliceous refractory materials is generally greater than 96% silica expressed as $SiO_2$ and may range as high as 99.8% $SiO_2$. Thus, by the term "vitreous silica" is meant a refractory comprising a silica glass having a thermal coefficient of expansion and $SiO_2$ content within the above range.

The most preferred refractories are those which have the highest purities concomitant with the lowest thermal coefficient of expansion. These properties are particularly possessed by vitreous silicas and more particularly those of the fused silica types. The latter materials have a silica content greater than 97% silica expressed as $SiO_2$ and a thermal coefficient of expansion not greater than about $6 \times 10^{-7}$ cm./cm./° C.

A typical fused silica of the type described above which is extremely useful in the practice of the invention, having a thermal coefficient of expansion of about $5 \times 10^{-7}$ cm./cm./° C., has the following typical analysis:

TABLE II

| Ingredients: | Percent by weight |
|---|---|
| $SiO_2$ | 97.3 |
| $Al_2O_3$ | 1.7 |
| Sub-oxides of silica | 1.0 |

The above type silica products are readily prepared by grinding very pure fused silica glasses. Likewise, the borosilicate glasses and Vycor silica glasses may be also ground to produce extremely useful refractories.

The particle size of the refractory may vary over a wide range. It is preferred, however, that the refractory particles be sufficiently small so that a uniform dispersion of refractory and binder may be made. The smaller the particle size the longer a slurry made up of binder and refractory, remains in a homogeneous state. It has been determined that particles ranging in size from 125 mesh to as low as a fraction of a micron may be employed. Preferred refractory materials have an average particle size ranging from 20 to 500 microns in particle diameter, with particles corresponding to the lower range diameters being most preferred. Specific vitreous silica substances, marketed under the name, Nalcast fall within the above preferred particle size range and have been employed with much success in preventing erosion of base portions of molds and adherence of same to the formed ingots.

The amount of binder making up a portion of the coating slurry must be such that it is present in an amount sufficient to bind the refractory particles together to thereby form a tightly adherent, continuous and unbroken coating which is securely bonded to the surface of the stool. Without proper amount of binder in relation to refractory, the resultant coating, after application and drying of slurry, exhibits a "pancake" effect with numerous undesirable holes appearing in the coating, thereby exposing portions of the stool or mold base surface. To achieve this, it has been determined that the slurry is preferably composed of from 10 to 70% by weight of refractory, and from 30 to 90% by weight of binder. Most preferably the slurry contains from 30 to 70% by weight of refractory and from 70 to 30% by weight of binder.

The following examples illustrate preferred embodiments of the invention herein. These examples are merely illustrative and the invention is not limited thereto.

Example I

A slurry is prepared by mixing with a Lightnin' mixer approximately equal parts by weight of crushed, fused silica in the form of a fine, free flowing powder (Nalcote 870–P) and an aqueous, ethylene-glycol-winterized colloidal silica sol (27%) by weight of silica and 0.35% by weight of the Xanthomonas hydrophilic colloid aforedescribed, the latter percent based on the weight of the slurry. The slurry has an initial viscosity of 2600 cps. Upon standing for 8 to 12 hours, the viscosity drops to about 2400 cps. and remains at this level.

At 0.45% and 0.50% by weight of the Xanthomonas hydrophilic colloid, the final viscosities of the slurry are 3300 and 4000 cps., respectively.

Example II

A solid mixture of crushed, fused silica in the form of a fine, free flowing powder (Nalcote 870-P) and 0.8% by weight of the Xanthomonas hydrophilic colloid, previously described, were mixed together. The dry mixture is packaged for shipment. This dry mixture can be used to form the slurries of the invention by adding it to and dispersing it in, with agitation, a colloidal silica sol of the character herein described, e.g., a 30% by weight aqueous colloidal silica sol.

The Xanthomonas hydrophilic colloid, in the proportions aforesaid, provides slurries of the refractory in the colloid silica sol binder of the character required for convenient spray application, particularly spraying in the form of an atomized spray. Other thickening agents, such as carboxy methyl cellulose, alginates, ethyl cellulose, causticized acrylic acid and acrylamide, causticized acrylic acid, and the like, do not produce similar results in terms of the properties of the slurry. These thickening agents, while forming a satisfactory initial slurry when used in appropriate concentrations, cause an increase in viscosity of the slurry upon standing to the point where solidification occurs as a single phase or in the lower phase when the slurry separates into upper water component and a lower slurries solid component. The latter characteristics are especially detrimental in spray application wherein the solidification results in plugging of spray lines and equipment.

Other thickening agents, as mentioned, do not provide the same degree of dispersion as a Xanthomonas colloid at a given viscosity level. Xanthomonas colloid, in other words, has the ability of suspending particles of fused silica for a longer period of time than other agents tested at dosages that provide the same or equivalent viscosity.

If desired, a microbiocide, such as aqueous formaldehyde may be added to the slurry of the invention.

Example III

A slurry as described in Example I is sprayed onto a hot, cast iron stool of a mold in the form of a high pressure atomized spray. The temperature of the hot stool is approximately 500° F. With this method of application, the slurry is broken down to fine particles which dry essentially instantaneously on contact with the hot, ingot stool. The sprayed coating builds up as a hard, dense, adherent layer of a thickness in the order of 1/64–1/8 inch. Certain areas of the stool may be given a thicker coating than the other areas for additional protection to the area where hot metal impingement is most severe.

The spray equipment preferably is high pressure spray equipment capable of providing at least about 200 p.s.i.g. at the pump discharge. High pressures of this order provide suitable flows with good atomization from an atomizing spray nozzle with refractory compositions of the invention.

The present invention is not concerned with the particular method of applying the refractory composition to the solid surface. The high pressure mechanical atomization method described in Example III is very effective. This process is described and claimed in application Ser. No. 429,918, filed of even date herewith by Edwin T. Sortwell.

Example IV

To evaluate the stabilizing effect of Xanthomonas hydrophilic colloid as compared to other thickening or suspending agents, the following tests were made.

The required amount of each suspending agent to give a viscosity of the order of 1500 to 2500 cps., as determined by preliminary tests, was added to 100 grams of a 325 mesh vitreous silica (Nalcote 870–P) and thoroughly blended.

This blend is then added to a solution of 86.4 grams of silica sol containing 30% $SiO_2$ (Nalcoag 1030) adjusted to pH of 10.9 with dilute sodium hydroxide, and water, and 13.0 grams of ethylene glycol. The amount of silica sol is adjusted to compensate for various amounts of suspending agents to maintain a 200 gram batch size.

Viscosities were measured with a Model LV Brookfield Viscosimeter at 60 r.p.m. shear utilizing a Number 4 spindle at about 70° F.

The following suspending agents were evaluated:

Xanthomonas hydrophilic colloid (Kelzan)
Carboxymethyl cellulose 68% (CMCT–13D)
Hydroxyethyl cellulose (Natrosol 250 MR)
Purified carboxymethyl cellulose (Carboxel M–245)
Hydroxypropyl methyl cellulose (Methocel 65 HG–2)
Ammonium alginate (Superloid)
Alginic acid (Kelcosol)

In Test No. 1, samples were placed in sealed glass jars and vibrated for 4 hours on an Eberbach Shaker at 100 shakes per minute.

In Test No. 2, samples were stored in sealed glass jars under static conditions at room temperature.

In Test No. 3, samples were stored in sealed glass jars under static conditions at room temperature. Periodically, each sample was re-mixed and subjected to viscosity testing.

In Test No. 4, samples were stored in sealed glass jars under static conditions at 120° F. for 24 hours, and permitted to cool to room temperature.

In Test No. 5, samples were sealed in glass jars under static conditions below 10° F. for 24 hours, and permitted to thaw to room temperature.

The results of these tests are shown in the following tables:

TEST NO. 1

| Suspending Agent | Percent Suspending Agent | Viscosity, cps. | Phase Separation | | | |
|---|---|---|---|---|---|---|
| | | | After 1 hour | After 2 hours | After 3 hours | After 4 hours |
| Kelzan | 0.22 | 1,500 | (1) | (1) | (1) | (1) |
| Do | 0.31 | 2,550 | (1) | (1) | (1) | (1) |
| CMC T13D | 0.7 | 1,660 | (1) | (1) | (1) | (1) |
| CMC T13D | 0.76 | 2,600 | (1) | (1) | (1) | (1) |
| Natrosol MR250 | 0.3 | 1,600 | 30% | 80% | (2) | |
| Do | 0.375 | 2,650 | 20% | 70% | (2) | |
| Carboxel M–245 | 0.57 | 1,500 | (2) | -------- | -------- | |
| Do | 0.60 | 2,400 | (2) | -------- | -------- | |
| Methocel 65HG–2 | 0.3 | 1,600 | (2) | -------- | -------- | |
| Do | 0.34 | 2,400 | (2) | -------- | -------- | |
| Superloid | 0.26 | 1,400 | (2) | -------- | -------- | |
| Do | 0.30 | 2,450 | 25% | (2) | (2) | |
| Kelcosol | 0.22 | 1,550 | 25% | (2) | (2) | |
| Do | 0.25 | 2,500 | 25% | 50% | 80% | (2) |

[1] None.
[2] Complete.

Compositions prepared with Kelzan and CMC T-13 did not separate into two phases. All other samples separated. Samples prepared with CMC T-13D solidified.

TEST NO. 2

| Suspending Agent | Percent Suspending Agent | Viscosity, cps. | Phase Separation After Eighteen Hours |
|---|---|---|---|
| Kelzan | 0.22 | 1,500 | None. |
| Do | 0.31 | 2,600 | Do. |
| CMC T13D | 0.7 | 1,600 | Do. |
| CMC T13D | 0.76 | 2,600 | Do. |
| Natrosol MR250 | 0.3 | 1,550 | Complete. |
| Do | 0.375 | 2,500 | Do. |
| Carboxel M-245 | 0.57 | 1,400 | 25% after ¼ hour, complete after 18 hours. |
| Do | 0.60 | 2,430 | Do. |
| Methocel 65HG-2 | 0.30 | 1,550 | 50% after 2 hours, complete after 18 hours. |
| Do | 0.34 | 2,500 | Do. |
| Superloid | 0.26 | 1,500 | 25% after ½ hour, complete after 18 hours. |
| Do | 0.30 | 2,500 | Do. |
| Kelcosol | 0.22 | 1,400 | Do. |
| Do | 0.25 | 2,700 | Do. |

Compositions prepared with Kelzan and CMC T-13D did not separate into two phases after 18 hours. All other samples separated. Samples prepared with CMC T-13D solidified.

TEST NO. 3

| Suspending Agent | Percent Suspending Agent | Initial Viscosity, cps. | Viscosity after 3 hours, cps. | Viscosity after 18 hours, cps. | Remarks |
|---|---|---|---|---|---|
| Kelzan | 0.22 | 1,600 | 1,500 | 1,400 | No separation, soft, easy to mix |
| Do | 0.31 | 2,600 | 2,500 | 2,400 | Do. |
| CMC T13D | 0.7 | 1,600 | 15,500 | (1) | Solid. |
| CMC T13D | 0.76 | 2,600 | (1) | (1) | Do. |
| Natrosol MR250 | 0.3 | 1,700 | 1,500 | 1,700 | Complete separation, hard to re-mix. |
| Do | 0.375 | 2,600 | 2,500 | 2,550 | Do. |
| Carboxel M-245 | 0.57 | 1,600 | 1,470 | 1,500 | Complete separation, soft, easy to mix. |
| Do | 0.60 | 2,550 | 2,450 | 2,200 | Do. |
| Methocel 65HG-2 | 0.30 | 1,600 | 1,250 | 850 | Complete separation, hard packed. |
| Do | 0.34 | 2,500 | 1,750 | 1,000 | Do. |
| Superloid | 0.26 | 1,620 | 1,500 | 1,250 | Complete separation, soft, easy to mix. |
| Do | 0.30 | 2,600 | 2,550 | 2,500 | Do. |
| Kelcosol | 0.22 | 1,550 | 1,450 | 1,200 | Do. |
| Do | 0.25 | 2,600 | 2,480 | 2,300 | Do. |

[1] Infinite.

Compositions prepared with Kelzan, Natrosol MR-250, Carboxel M-245, Superloid and Kelcosol did not show much change is viscosity after 18 hours. The viscosities of all other samples changed considerably.

TEST NO. 4

| Suspending Agent | Percent Suspending Agent | Initial Viscosity, cps. | Observations | |
|---|---|---|---|---|
| | | | Appearance After 24 Hours | Re-mixed Viscosity after 42 hours Storage cps. |
| Kelzan | 0.22 | 1,700 | ⅛" thin water layer | 1,300 |
| Do | 0.31 | 2,600 | ¹⁄₁₆" thin water layer | 2,000 |
| CMC T13D | 0.7 | 1,600 | Solid | (1) |
| CMC T13D | 0.76 | 2,400 | do | (1) |
| Natrosol MR250 | 0.3 | 1,650 | Complete separation | 800 |
| Do | 0.375 | 2,650 | do | 1,200 |
| Carboxel M-245 | 0.57 | 1,400 | do | 4,200 |
| Do | 0.60 | 2,550 | do | (2) |
| Methocel 65HG-2 | 0.3 | 1,750 | do | 1,200 |
| Do | 0.34 | 2,400 | do | 1,200 |
| Superloid | 0.26 | 1,500 | do | 1,850 |
| Do | 0.3 | 2,500 | do | 2,900 |
| Kelcosol | 0.22 | 1,500 | do | 1,400 |
| Do | 0.25 | 2,500 | do | 2,200 |

[1] Infinite.
[2] Thick paste.

Compositions prepared with Kelzan and CMC T-13D did not separate into two phases. All other samples separated. Kelzan and Kelcosol prepared compositions showed little change in viscosity but all others showed a marked change.

TEST NO. 5

| Suspending Agent | Percent Suspending Agent | Initial Viscosity, cps. | Appearance After Thawing | Re-mixed, Viscosity after Storage, cps. |
|---|---|---|---|---|
| Kelzan | 0.22 | 1,700 | 1/16" thin water layer | 1,500 |
| Do | 0.31 | 2,600 | No separation | 2,100 |
| CMC T13D | 0.7 | 1,600 | No separation, solid | (1) |
| CMC T13D | 0.76 | 2,400 | ....do | (1) |
| Natrosol MR250 | 0.3 | 1,650 | Complete separation | 1,400 |
| Do | 0.375 | 2,650 | ....do | 2,250 |
| Carboxel M-245 | 0.57 | 1,400 | ....do | (2) |
| Do | 0.60 | 2,550 | ....do | (2) |
| Methocel 65H G-2 | 0.3 | 1,750 | ....do | 1,300 |
| Do | 0.34 | 2,400 | ....do | 1,700 |
| Superloid | 0.26 | 1,500 | ....do | 1,600 |
| Do | 0.30 | 2,500 | ....do | 1,500 |
| Kelcosol | 0.22 | 1,500 | ....do | 1,500 |
| Do | 0.25 | 2,500 | ....do | 2,350 |

[1] Infinite.
[2] Thick paste.

Compositions prepared with Kelzan and CMC T-13D did not separate into two phases after thawing. Samples prepared with Kelzan, Natrosol MR-250 and Kelcosol showed little change in viscosity. Samples prepared with CMC T-13D solidified.

From the foregoing results it will be seen that the Xanthomonas hydrophilic colloid was the only suspending agent which satisfactorily stabilized the refractory suspension so as to meet all of the tests.

It will be understood that the invention in its broader aspects is not limited to the coating of stools but is applicable to other uses where it is desired to apply a refractory coating, as for example, coating a firebrick roof of an open hearth furnace. The invention is especially useful where the surface to be coated is at a temperature in excess of the boiling point of water.

In the most preferred method the coating slurry is applied to solid surfaces, especially metal surfaces, having a temperature ranging from the boiling point of water to 1,000° F., and more preferably from 212° F. to 800° F. Best adherence of the solid coating to stools is achieved by slurry application to the stools at a temperature range of 200–500° F. For best results, it has been determined that films should measure in thickness from 0.01 inch to 3 inch and most preferably from 0.01 inch to 1/8 inch. About 1/16 inch is a most practical thickness.

It is believed that the excellent coating success achieved by use of the above described refractory compositions is their ability to remain stable, to provide particles of the proper physical characteristics for application to solid surfaces and to form a strong ceramic coating. The invention also provides coatings which are resistant to acids, for example, when the coated surfaces are brought into contact with acidic vapours, gases and liquids.

The invention is hereby claimed as follows:

1. A coating composition comprising finely-divided macroscopic refractory solid particles suspended in an aqueous liquid containing a binder from the class consisting of colloidal silica sol, aqueous dispersions of aluminum phosphate, ethyl silicate, sodium silicate and mixtures thereof, the proportions of said refractory solid particles and said aqueous liquid containing a binder being within the range of 10% to 70% by weight and 30% to 90% by weight, respectively, said suspension being stabilized by intimate dispersion therewith of a stabilizing amount of Xanthomonas campestris hydrophilic colloid.

2. A coating composition comprising finely-divided macroscopic refractory solid particles suspended in an aqueous liquid containing a binder from the class consisting of colloidal silica sol, aqueous dispersions of aluminum phosphate, ethyl silicate, sodium silicate and mixtures thereof, the proportions of said refractory solid particles and said aqueous liquid containing a binder being within the range of 10% to 70% by weight and 30% to 90% by weight, respectively, said suspension being stabilized by intimate dispersion therewith of a stabilizing amount of a Xanthomonas campestris hydrophilic colloid, said refractory solid particles having a particle size not larger than 125 mesh, Standard Sieve Series, and said composition having a viscosity of 1500–4500 centipoises at 70° F.

3. A composition as claimed in claim 1 which also contains a sufficient amount of an alkylene glycol to inhibit bacterial action on said Xanthomonas campestris hydrophilic colloid.

4. A composition as claimed in claim 1 in which said liquid comprises an alkylene glycol in sufficient amount to lower the freezing temperature of said composition.

5. A composition as claimed in claim 1 which also contains an alkali sufficient to render it alkaline to a pH not exceeding about 10.5.

6. A coating composition comprising finely-divided macroscopic vitreous silica dispersed in an aqueous silica sol having also dispersed therein about 0.2–1.0% by weight, based on said composition, of a Xanthomonas campestris hydrophilic colloid suspending agent, the proportions of said finely divided macroscopic vitreous silica and said aqueous silica sol in said composition being within the range of 10% to 70% by weight and 30% to 90% by weight, respectively.

7. A stool coating composition useful in coating of cast iron mold stools comprising finely-divided macroscopic vitreous silica dispersed in an aqueous silica sol having also dispersed therein about 0.2–1.0% by weight, based on said composition, of a Xanthomonas campestris hydrophilic colloid suspending agent, said composition having a viscosity in the range of about 1500–2500 c.p.s. at 20° F., the proportions of said finely divided macroscopic vitreous silica and said aqueous silica sol in said composition being within the range of 10% to 70% by weight and 30% to 90% by weight, respectively.

8. A stable coating composition comprising 10–70 weight percent finely-divided macroscopic refractory material dispersed in 30–90 weight percent of an aqueous liquid containing a binder from the class consisting of colloidal silica sol, aqueous dispersions of aluminum phosphate, ethyl silicate, sodium silicate and mixtures thereof, and also having dispersed therein about 0.2–2.0% by weight, based on the total weight of said composition, of a Xanthomonas campestris hydrophilic colloid suspending agent.

9. A process for forming a protective, adherent on a solid surface which comprises applying to such surface at least one layer of a coating composition comprising finely-divided macroscopic refractory particles dispersed in an aqueous liquid containing a binder from the class consisting of colloidal silica sol, aqueous dispersions of aluminum phosphate, ethyl silicate, sodium silicate and mixtures thereof, and having also dispersed therein a quantity of a Xanthomonas campestris hydrophilic colloid suspending agent sufficient to give a viscosity of 1500–4500 cps. at 70° F., the proportions of said refractory solid particles and said aqueous liquid containing a binder being within the range of 10% to 70% by weight and 30% to 90% by weight, respectively, and vaporizing the liquid phase of said composition to leave a dense, tightly adherent refractory coating on said surface.

10. A process for forming a protective adherent coating on cast iron surfaces which comprises applying to a cast iron surface at least one layer of a coating composition comprising finely-divided macroscopic vitreous silica dispersed in an aqueous silica sol having also dispersed therein a quantity of a *Xanthomonas campestris* hydrophilic colloid suspending agent sufficient to give a viscosity of 1500–2500 cps. at 70° F., the proportions of said finely divided macroscopic vitreous silica and said aqueous silica sol in said composition being within the range of 10% to 70% by weight and 30% to 90% by weight, respectively, and vaporizing the liquid phase of said composition to leave a dense, tightly adherent siliceous coating on said surface.

11. A process as claimed in claim 9 in which said solid surface to which said coating is applied is a mold surface.

References Cited

UNITED STATES PATENTS

| | | | |
|---|---|---|---|
| 3,110,944 | 11/1963 | Phelps | 106—38.22 X |
| 3,184,813 | 5/1965 | O'Shea | 117—5.3 X |
| 3,232,929 | 2/1966 | McNeely et al. | 260—209 |
| 3,236,831 | 2/1966 | Schweiger | 260—209 |
| 3,251,768 | 5/1966 | Walker | 260—209 |

JULIUS FROME, *Primary Examiner.*

L. HAYES, *Assistant Examiner.*

U.S. Cl. X.R.

106—38.35, 69, 84, 209; 117—5.3

UNITED STATES PATENT OFFICE

CERTIFICATE OF CORRECTION

Patent No. 3,428,464                              February 18, 1969

Leonard W. Pollard

It is certified that error appears in the above identified patent and that said Letters Patent are hereby corrected as shown below:

Column 3, line 9, "polyacrylamine, a" should read -- polyacrylamide, a causticized polyacrylic acid, --. Column 4, TABLE I, sixth column, line 8 thereof, ".030" should read -- 0.30 --. Columns 9 and 10, table for TEST NO. 3, fifth column line 7 thereof, "1,500" should read -- 1,550 --.

Signed and sealed this 21st day of April 1970.

(SEAL)
Attest:

Edward M. Fletcher, Jr.

Attesting Officer

WILLIAM E. SCHUYLER, JI

Commissioner of Patent